June 2, 1925. 1,540,261

M. B. FARMER

HAND ACTUATING MEANS FOR THE FOOT PEDALS OF MOTOR VEHICLES

Filed Dec. 13, 1924 2 Sheets-Sheet 1

M. B. Farmer,
Inventor

By Clarence O'Brien
Attorney

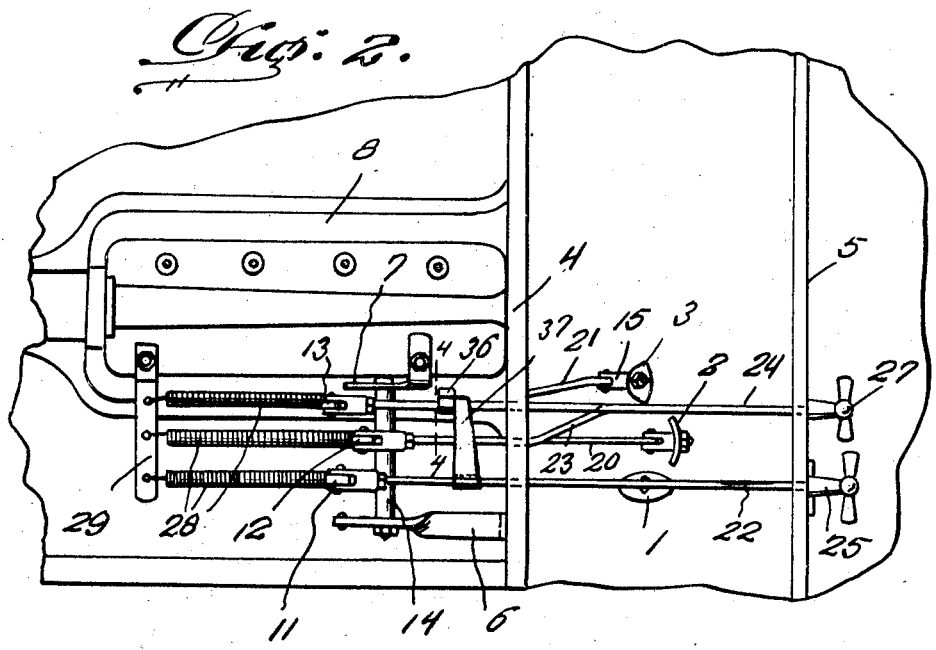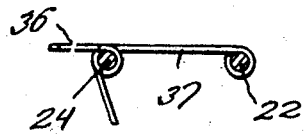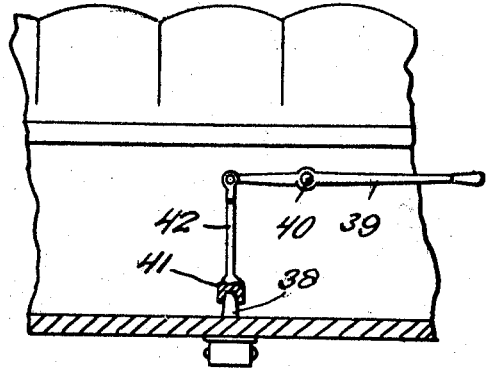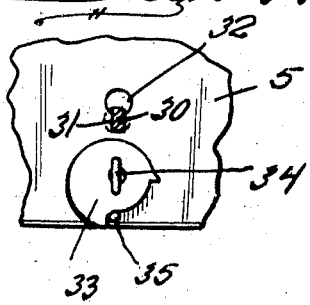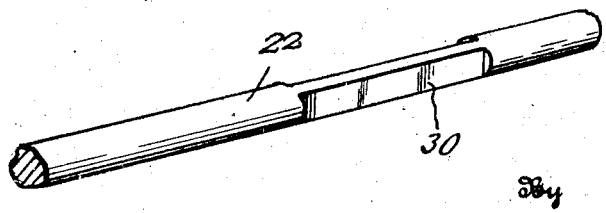

Patented June 2, 1925.

UNITED STATES PATENT OFFICE.

MIKE B. FARMER, OF PRATT, KANSAS.

HAND ACTUATING MEANS FOR THE FOOT PEDALS OF MOTOR VEHICLES.

Application filed December 13, 1924. Serial No. 755,780.

*To all whom it may concern:*

Be it known that I, MIKE B. FARMER, a citizen of the United States, residing at Pratt, in the county of Pratt and State of Kansas, have invented certain new and useful Improvements in a Hand Actuating Means for the Foot Pedals of Motor Vehicles, of which the following is a specification.

This invention relates to a highly novel means for facilitating the actuation of the usual foot pedal of a motor vehicle without the use of the feet.

One of the important objects of the present invention is to provide a device of the above mentioned character which is particularly adapted to be used in conjunction with the clutch, reverse and brake pedals respectively of an automobile of the Ford type whereby the operator may control the actuation of the foot pedal by hand.

Another important object of the invention is to provide a device of the above mentioned character, wherein the hand operated means for controlling the actuation of the foot pedal is disposed within easy access to the operator of the motor vehicle, means being further provided for returning the several parts to their normal position after the same has been actuated.

Another important object of the invention is to provide a device of the above mentioned character, which is of such construction as to enable the same to be readily and easily attached in position on the motor vehicle without materially altering the same.

A still further object is to provide a device of the above mentioned character, which is simple in construction, inexpensive, strong and durable and furthermore adapted for the purposes for which it is designated.

Other objects and advantages of this invention will become apparent during the course of the following description.

In the accompanying drawings forming a part of this specification and in which like numerals designate like parts throughout the same—

Figure 2 is a top plan view.

Figure 4 is a sectional view taken approximately on line 4—4 of Figure 2.

Figure 6 is a detail of the hand operated means associated with the starter.

Figure 7 is a detail of the locking means associated with the operating rod for the clutch pedal showing the operating rod in locked position, and Figure 8 is a detail fragmentary perspective view of the upper portion of the operating rod associated with the clutch pedal.

Figure 1:
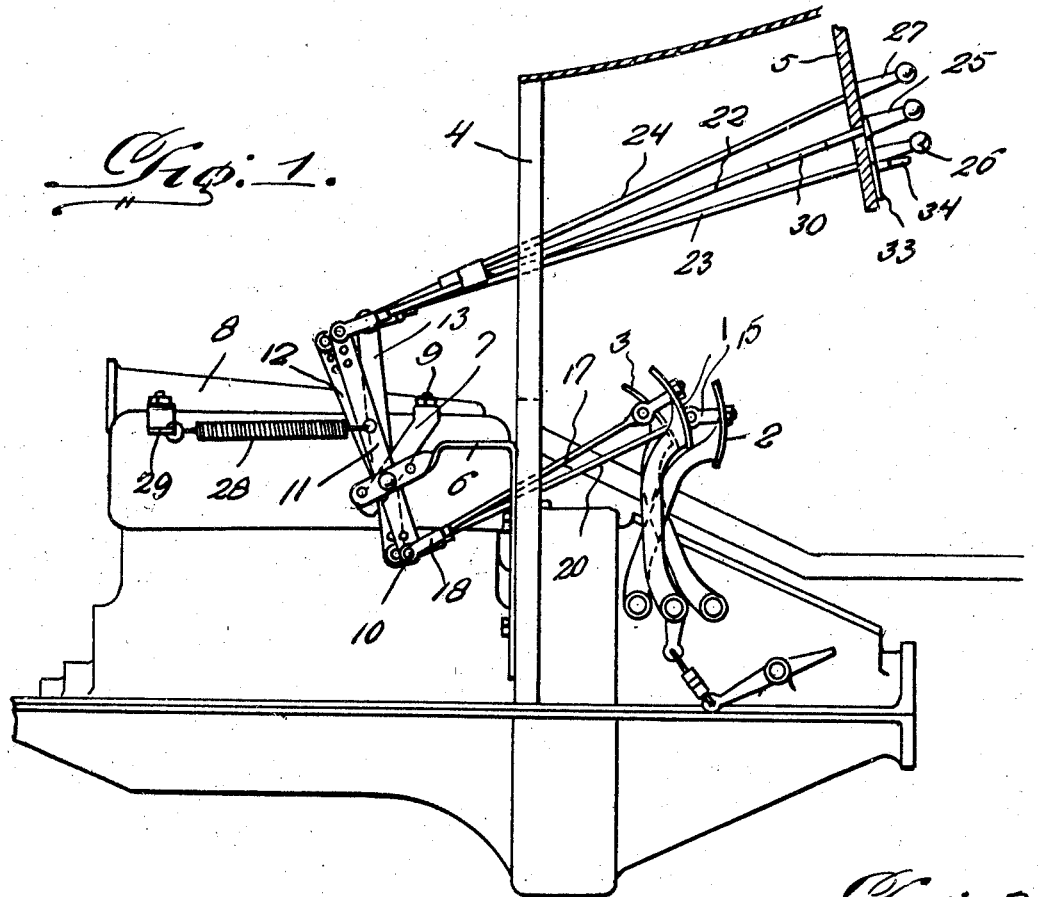
Figure 1 is a side elevation of the apparatus embodying my invention showing the same attached.
Figure 3:
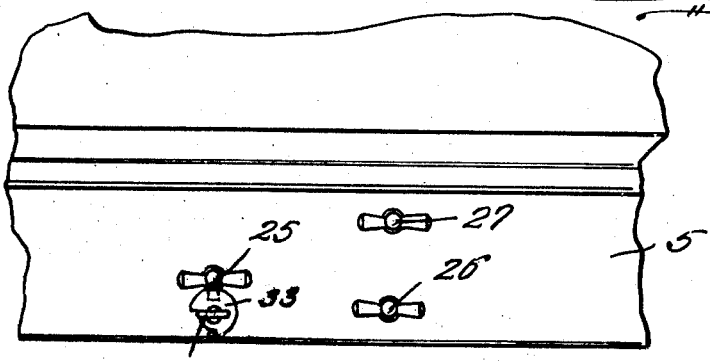
Figure 3 is a front elevation of the instrument board of a motor vehicle showing the arrangement of the handle mounted on the upper ends of the operating rods.
Figure 5:
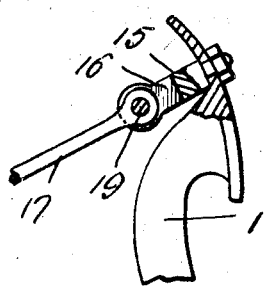
Figure 5 is a detail of the connection between each of the rods and its respective foot pedal.

In the drawings, wherein for the purpose of illustration is shown the preferred embodiment of my invention, the numerals 1, 2 and 3 designate the clutch reverse and foot brake pedals respectively of a motor vehicle, preferably of the Ford type. The dash board of the motor vehicle is indicated at 4 and the instrument board at 5. A suitable bracket 6 is secured on the dash board 4 and cooperates with a bracket 7 which is secured on the left side of the internal combustion engine 8 by one of the engine bolts 9. A shaft 10 has its ends supported in the brackets 6 and 7 respectively as clearly illustrated in Figures 1 and 2 of the drawings. The purpose thereof will hereinafter be more fully described. Vertically extending levers 11, 12 and 13 respectively are pivotally supported adjacent their lower ends on the shaft 10 and are arranged in spaced relation with respect to each other by means of the spacing sleeve 14 disposed over the shaft between the levers and the brackets as is more clearly illustrated in Figure 2.

Each of the foot levers or pedals has a bolt 15 detachably associated therewith, and the forward end of each bolt is bifurcated as illustrated at 16, the bifurcated ends being provided with registering openings. A rod 17 is connected at its forward end to the lower end of the lever 11 as at 18 and the rear end thereof is provided with an eye portion which is disposed within the bifurcated end 16 of the bolt 15 associated with the clutch pedal 1, a locking pin 19 extending through the registering openings provided in the bifurcated ends of the bolt and the eye portion of the rod. Similar rods 20 and 21 afford a connection between the lower ends of the levers 12 and 13 and the reverse and foot brake pedals 2 and 3 respectively.

The upper ends of the levers 11, 12 and 13 respectively are each provided with a series of spaced openings for adjustably connecting thereto the forward ends of the operating rods 22, 23 and 24 respectively, the rods extending rearwardly and being inclined upwardly through the dash board 4 and through the instrument board 5. Suitable handles 25, 26 and 27 are secured on the upper ends of the rods 22, 23 and 24 respectively.

For the purpose of normally holding the levers 11, 12 and 13 and the operating rods associated therewith in their normal positions, coil springs such as are shown at 28 are connected at one end to the respective levers at a point adjacent the upper ends thereof, the forward ends of the springs being secured to a suitable bracket 29 which extends laterally from the forward end of the internal combustion engine 8. This construction is more clearly illustrated in Figures 1 and 2 of the drawings.

The upper portion of the operating rod 22 which controls the actuation of the clutch pedal 1 is cut away on its opposite sides as illustrated at 30 with reference more particularly to Figure 8 and the purpose thereof is to permit the reduced portion of the rod 22 to be disposed within the slot 31 which extends from the opening 32 in the instrument board 5 through which the rod 22 is adapted to pass whereby the clutch pedal is maintained in a neutral position. A cam such as is shown at 33 is rotatably supported on the instrument board 5 below the slot 31 and when the same is rotated in one direction, by means of the handle 34 associated therewith, the reduced portion of the rod 22 will be raised out of engagement with the slot 31 and disposed within the opening 32 so that the rod 22 may be adapted for slidable movement through the opening when the handle 25 is actuated. A stop such as illustrated at 35 is mounted on the instrument board 5 and cooperates with the cam 33 in the manner clearly illustrated in Figure 7.

For the purpose of simultaneously moving the clutch pedal 1 to a neutral position when the foot brake 3 is actuated, I provide a finger 36 on the operating rod 24 adjacent the forward end thereof, and an arm such as is shown at 37 is associated with the forward portion of the operating rod 22, the arm extending transversely across the rods 23 and 24 and being disposed rearwardly of the finger 36 in the manner more clearly illustrated in Figure 2. It is obvious that when the handle 27 is pulled rearwardly, the foot brake pedal will be actuated and the finger 36 being in engagement with the arm 37 will simultaneously cause the operation of the operating rod and lever associated with the clutch pedal 1.

It will thus be seen from the foregoing description, that means has been provided for facilitating the actuation of the foot pedals by hand, the hand operating means being disposed within easy access to the operator so that the same may be readily and efficiently actuated whenever necessary. The springs 28 will return the operating means to its normal position after the same has been actuated as is obvious from the construction shown. It is also to be understood that the mechanism is so arranged as to enable the foot pedals to be actuated in the usual manner by foot in a simple and efficient manner.

A hand operated means has also been provided for actuating the starter switch designated generally at 38 and the same comprises a hand lever 39 which is pivotally supported intermediate its ends as illustrated at 40 below the front seat of the motor vehicle. A socket member 41 receives the upper end of the button of the usual starter switch and the socket member 41 is provided with an extension 42 which is pivotally connected at its upper end to the shorter arm of the lever as clearly illustrated in Figure 6. It is obvious that when the free end of the lever 39 is pulled upwardly, the socket member 41 will be pushed downwardly causing the simultaneous downward movement of the button of the starter switch which will be operated before starting the motor.

The provision of an apparatus of the above mentioned character, enables the same to be easily and readily attached in position upon a motor vehicle without materially altering the same and will at all times be positive and efficient in its operation.

While I have shown the preferred embodiment of my invention, it is to be understood that various changes in the size, shape and arrangement of parts may be resorted without departing from the spirit of the invention and the scope of the appended claims.

Having thus described the invention, what I claim is:

1. In combination with a motor vehicle including the usual foot pedals, and the dash board, of pivotally supporting levers disposed forwardly of the dash board, rods connecting the lower ends of said levers with the respective foot pedals, operating rods connected at their forward ends to the upper ends of said levers and extending through said dash board, and handles on the opposite ends of said operating rods whereby the foot pedals are actuated independently by the hand.

2. In combination with a motor vehicle including the usual foot pedals, and the dash board, of pivotally supported levers disposed forwardly of the dash board, rods connecting the lower ends of said levers with the respective foot pedals, operating rods connected at their forward ends to the upper ends of said levers and extending through said dash board, handles on the opposite ends of said operating rods whereby the foot pedals are actuated independently by hand, and means for normally holding said foot pedal actuating means in its normal inoperative position.

3. In combination with a motor vehicle including the usual foot pedals, and the dash board, of pivotally supported levers disposed forwardly of the dash board, rods connecting the lower ends of said levers with the respective foot pedals, operating rods connected at their forward ends to the upper ends of said levers and extending through said dash board, handles on the opposite ends of said operating rods whereby the foot pedals are actuated independently by hand, means for normally holding said foot pedal actuating means in its normal inoperative position, and means for actuating certain of said foot pedals simultaneously.

4. In combination with a motor vehicle including the usual clutch, reverse and foot brake pedals, and the dash board, of levers pivotally supported forwardly of the dash board, a connection between said foot pedal and the lower ends of the respective levers, operating rods adapted for slidable movement through the dash board, the forward ends thereof being connected to the upper ends of the respective levers, handles on the opposite ends of said operating rods for facilitating the actuation of the foot pedals independently by hand, and means associated with the operating rod connected to the foot brake pedal whereby the clutch pedal is adapted for simultaneous action with the foot brake pedal when the latter is operated, said means comprising an arm extending laterally from the forward portion of the first mentioned operating rod, and a finger on the second mentioned operating rod, adapted to engage said arm.

5. In combination with a motor vehicle including the usual clutch, reverse and foot brake pedals, and the dash board, of levers pivotally supported forwardly of the dash board, a connection between said foot pedal and the lower ends of the respective levers, operating rods adapted for slidable movement through the dash board, the forward ends thereof being connected to the upper ends of the respective levers, handles on the opposite ends of said operating rods for facilitating the actuation of the foot pedals independently by hand, means associated with the operating rod connected to the foot brake pedal whereby the clutch pedal is adapted for simultaneous action with the foot brake pedal when the latter is operated, said means comprising an arm extending laterally from the forward portion of the first mentioned operating rod, and a finger on the second mentioned operating rod adapted to engage said arm, and means for holding the clutch pedal in a neutral position.

6. In combination with a motor vehicle including the usual clutch, reverse and foot brake pedals, and the dash board, of levers pivotally supported forwardly of the dash board, a connection between said foot pedal and the lower ends of the respective levers, operating rods adapted for slidable movement through the dash board, the forward ends thereof being connected to the upper ends of the respective levers, handles on the opposite ends of said operating rods for facilitating the actuation of the foot pedals independently by hand, means associated with the operating rod connected to the foot brake pedal whereby the clutch pedal is adapted for simultaneous action with the foot brake pedal when the latter is operated, said means comprising an arm extending laterally from the forward portion of the first mentioned operating rod, a finger on the second mentioned operating rod adapted to engage said arm, means for holding the clutch pedal in a neutral position, and means for returning the foot pedal operating means to its normal inoperative position.

7. In combination with a motor vehicle, including the usual clutch, reverse and foot brake pedals, and the instrument board, of levers pivotally supported forwardly of the instrument board, connections between the lower ends of the levers and the respective foot pedals, operating rods adapted for slidable movement through the instrument board and connected at their forward ends to the upper ends of the respective levers, handles on the opposite ends of said operating rods, means for holding the clutch pedal in a neutral position, said means comprising a flattened portion provided in the rear portion of the operating rod connected to the clutch pedal, said flattened portion adapted to be seated in a slot formed in the instrument board and extending downwardly from the opening through which the operating rod for the clutch pedal is adapted to extend.

8. In combination with a motor vehicle, including the usual clutch, reverse and foot brake pedals, and the instrument board, of levers pivotally supported forwardly of the instrument board, connections between the lower ends of the levers and the respective foot pedals, operating rods adapted for slidable movement through the instrument board and connected at their forward ends to the upper ends of the respective levers, handles on the opposite ends of said operating rods, means for holding the clutch pedal in a neutral position, said means comprising a flattened portion provided in the rear portion of the operating rod connected to the clutch pedal, said flattened portion adapted to be seated in a slot formed in the instrument board and extending downwardly from the opening through which the operating rod for the clutch pedal is adapted to extend, and means for normally holding the flattened portions of said operating rod out of engagement with said slot.

9. In combination with a motor vehicle, including the usual clutch, reverse and foot brake pedals, and the instrument board, of levers pivotally supported forwardly of the instrument board, connections between the lower ends of the levers and the respective foot pedals, operating rods adapted for slidable movement through the instrument board and connected at their forward ends to the upper ends of the respective levers, handles on the opposite ends of said operating rods, means for holding the clutch pedal in a neutral position, said means comprising a flattened portion provided in the rear portion of the operating rod connected to the clutch pedal, said flattened portion adapted to be seated in a slot formed in the instrument board and extending downwardly from the opening through which the operating rod for the clutch pedal is adapted to extend, means for normally holding the flattened portions of said operating rod out of engagement with said slot, said means comprising a cam adapted for rotation on the instrument board and adapted for engagement with the flattened portion of said operating rod.

In testimony whereof I affix my signature.

MIKE B. FARMER.